United States Patent
Namba (10) Patent No.: US 6,314,418 B1
(45) Date of Patent: Nov. 6, 2001

(54) INDEX MANAGING UNIT, INDEX UPDATING METHOD, INDEX MANAGING METHOD, COMPUTER-READABLE RECORDING MEDIUM RETAINING AN INDEX UPDATING PROGRAM, AND COMPUTER-READABLE RECORDING MEDIUM RETAINING AN INDEX MANAGING PROGRAM

(75) Inventor: Isao Namba, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/127,955

(22) Filed: Aug. 3, 1998

(30) Foreign Application Priority Data

Mar. 20, 1998 (JP) .................................. 10-071682

(51) Int. Cl.$^7$ ...................................... G06F 17/30
(52) U.S. Cl. ................................ 707/2; 707/205
(58) Field of Search .................. 707/1, 2, 205, 707/206

(56) References Cited

U.S. PATENT DOCUMENTS

| | | | |
|---|---|---|---|
| 5,247,660 | * 9/1993 | Ashcraft et al. | 395/600 |
| 5,276,830 | * 1/1994 | Endo et al. | 395/425 |
| 5,481,702 | * 1/1996 | Takahashi | 395/600 |
| 5,737,603 | * 4/1998 | Fujiki | 707/101 |
| 5,764,993 | * 6/1998 | Shindo | 717/9 |
| 5,813,011 | * 9/1998 | Yoshida et al. | 707/101 |
| 5,884,304 | * 3/1999 | Davis, III et al. | 707/4 |
| 6,038,571 | * 3/2000 | Numajiri et al. | 707/206 |

FOREIGN PATENT DOCUMENTS

| | | |
|---|---|---|
| 59002160 | 1/1984 | (JP) . |
| 02028846 | 1/1990 | (JP) . |
| 08190501 | 7/1996 | (JP) . |

OTHER PUBLICATIONS

Japanese Patent Office Action mailed Mar. 6, 2001, including English translation thereof, in a counter part Japanese Patent Application No. HEI 10–071682.

* cited by examiner

*Primary Examiner*—Thomas Black
*Assistant Examiner*—Mary Wang
(74) *Attorney, Agent, or Firm*—Staas & Halsey LLP (57) ABSTRACT

The present invention relates to an index managing unit which comprises an index storage managing section for managing content information corresponding to key information constituting an index on a storage area, a management information storage managing section for managing management information about the index on the storage area, and a management information updating section for updating the management information on the basis of record information inputted as information to be added to the index and constructed in units of a set of key information and content information. The index storage managing section is composed of an area calculating section for calculating, through an arithmetic, a free area to be set when necessary on the basis of the management information at the updating of the index and an area allocating section for allocating the storage area for the storage of the index on the basis of the calculated free area. Thus, the allocation of an area for an index having a data structure where the lengths of the record portions depend upon keys to extremely differ from each other is effectively possible through the use of statistics information about the index such as the occurrence frequency of record information at every key.

10 Claims, 4 Drawing Sheets

INDEX MANAGING UNIT, INDEX UPDATING METHOD, INDEX MANAGING METHOD, COMPUTER-READABLE RECORDING MEDIUM RETAINING AN INDEX UPDATING PROGRAM, AND COMPUTER-READABLE RECORDING MEDIUM RETAINING AN INDEX MANAGING PROGRAM

BACKGROUND OF THE INVENTION (1) Field of the Invention

The present invention relates to an index managing (controlling) unit, an index updating method, an index managing method, a computer-readable recording medium retaining an index updating program, and a computer-readable recording medium holding an index managing program, which are suitably employed for managing and updating an index file for use in a retrieval system which retrieves a large volume of data information using an item as a key (on the basis of an item) and extracts related information.

An index file is for the purpose of storing a large amount of record information in relation to key information, and particularly, an index file being of an inverted file type is for searching record information at a high speed on the basis of key information forming an item which organizes an index, and is available for full-text retrieval.

(2) Description of the Related Art

A common retrieval system is allowed to conduct an information retrieval with respect to, for example, a group of document files. In more detail, the retrieval system is designed to perform such information retrieval processing as to use some word as a key to output a group of document numbers, associated with this key, as a retrieval result concurrently with retrieving a group of document files with document numbers.

In such retrieval processing, in order to speed up the processing to be taken until the output of a retrieval result after the input of a retrieval key, the management of information about a group of document files is made in a manner that held on a storage area is an inverted file type index file being the collection of retrieval results corresponding to keys determined in advance.

Briefly, when one key is inputted to the retrieval system, a retrieval result can be outputted through only an operation of merely opening the corresponding record information in the above-mentioned index file on the basis of this key.

Meanwhile, for the area allocation on a storage area of an index file in a prior retrieval system, an area block with a given size is initially given as an area for a portion of record information corresponding to key information and the record information is stored therein, whereas record information exceeding the given size is recorded across a plurality of area blocks.

More specifically, an area block with a given length is allocated as an initially set value onto a storage area in connection with each key so that the record information corresponding to each key is put in that area block, and if the area size of the allocated area block is insufficient to the record information to be stored, an area block for storing the record corresponding to that key is given at a location remote from the initially allocated area and a chain is established between these area blocks, thereby securing the area for storing the record information corresponding to the key information.

However, in the case of the prior area allocation technique on the storage area in the index file, when applying as the index file the inverted file type for use in a full-text retrieval, the record information to be stored in conjunction with the key information significantly differ in size from each other depending upon the key information. In such a condition, if an area block with a given size is initially allocated in units of K bytes, a problem will arises in that, because the most keys only require a considerably smaller area than this area block, an excessive area consequently takes place for the storage of the record information, which can interfere with the effective utilization of the storage area.

On the other hand, in the prior retrieval system, if a constant area is allocated even in incrementing the areas, the increment expectable area sizes vary in accordance with the keys. Particularly, a serious problem here is that an excessive area is allocated with respect to a small-increment expectable key.

SUMMARY OF THE INVENTION

The present invention has been developed in order to eliminate the above-mentioned problems, and it is therefore an object of this invention to provide an index managing unit, an index updating method, an index managing method, a computer readable recording medium retaining an index updating program, and a computer readable recording medium retaining an index managing program, which are capable of effectively allocating areas for an index having a long record string for a key as seen in a full-text retrieval system or the like and further having a data structure, where the lengths of the record sections depend upon keys to extremely differ from each other, through the use of statistics information on an index, such as an occurrence frequency of record information for each key and others.

For this purpose, in accordance with the present invention, an index managing unit, which is made to control a storage condition of an index composed of key information forming items and content information forming the contents of the key information on a storage area, comprises an index storage managing section for managing, on the storage area, the content information corresponding to the key information constituting the index and a management information storage managing section for managing, on the storage area, management information associated with the index, wherein the management information storage managing section includes a management information updating section for updating the management information undergoing the management on the storage area on the basis of record information constructed in units of a set of key information and content information inputted as information to be added to the index managed on the storage area, while the index storage managing section includes an area calculating section for calculating a free area, to be set when necessary, through an arithmetic or operation on the basis of the management information under the management by the management information storage managing section when the index on the storage area is updated on the basis of the record information inputted and an area allocating section for allocating a storage area for storage of the index on the basis of the free area calculated by the area calculating section.

Thus, in the index managing unit according to this invention, the area calculating section calculates a free area, to be set when needed, through an arithmetic on the basis of management information under management by the management information storage managing section while the area allocating section allocates a storage area for storage of the index on the basis of the calculated value, which can allocates an area with an appropriate size in accordance with the management information of the record information inputted while preventing an excessive area allocation.

Furthermore, in accordance with this invention, an index updating method of registering information to be added to an index on a storage area to update the index composed of key information forming items and content information forming the contents of the key information which are managed on the storage area comprises: a management information updating step of receiving input of record information composed of a set of key information and content information corresponding to the key information as the information to be added to the index to update management information for the index on the basis of the inputted record information; an extraction step of extracting, on the basis of the key information corresponding to the record information, a position on the storage area accepting registration of the content information of the inputted record information; a decision step of deciding whether or not successive free areas assuming a size needed for the registration of the content information of the record information exist at the position on the storage area obtained in the extraction step; an area calculating step of, when a result in the extraction step shows no extraction of the position on the storage area accepting the registration of the content information of the record information or, when a result in the decision step shows absence of the successive free areas assuming the size needed for the registration of the content information of the record information, calculating, through a given arithmetic, a necessary area size for the registration of the content information estimated with respect to the key information of the record information; an area allocating step of allocating an area with the size calculated in the area calculating step for the registration of the content information of the record information; and a registration step of, when the decision step makes a decision to the presence of successive free areas, registering the content information of the record information, to be added, on the successive free areas while, when the area allocating step allocates an area, registering the content information thereof on the allocated area.

With the index updating method according to this invention, in the area calculating step, the given operation is conducted to calculate a necessary area size for the registration of the content information estimated with respect to the record information on the basis of the management information, and in the area allocating step, the storage area for the storage of the index is allocated on the basis of the calculated size value, and consequently, as the effects, the area with an appropriate size is allocated in accordance with the management information of the record information inputted while the excessive area allocation is preventable.

Still further, a computer-readable recording medium according to this invention retains an index updating program for registering information to be added to an index, composed of key information forming items and content information forming the contents of the key information, on a storage area to update the index, with the index being managed on the storage area, which program makes a computer function as: management information updating means for receiving input of record information composed of a set of key information and content information corresponding to the key information as the information to be added to the index and for updating management information for the index on the basis of the inputted record information; extraction means for extracting, on the basis of the key information corresponding to the record information, a position on the storage area accepting registration of the content information of the inputted record information; decision means for deciding whether or not successive free areas assuming a size needed for the registration of the content information of the inputted record information exist at the position on the storage area obtained as an extraction result in the extraction means; area calculating means for, when the extraction means results in no extraction of the position on the storage area accepting the registration of the content information of the record information or when the decision means decides that there is no successive free areas assuming the size needed for the registration of the content information of the record information, calculating, through a given operation, a necessary area size for the registration of the content information estimated with respect to the key information of the record information; area allocating means for allocating an area with the size calculated in the area calculating means for the registration of the content information of the record information; and registration means for, when the decision means makes a decision to the presence of successive free areas, registering the content information of the record information, to be added, on the successive free areas while, when the area allocating means allocates the area, registering the content information thereof on the allocated area.

With the computer-readable recording medium retaining an index updating program according to this invention, a computer is made to function as area calculating means to calculate, through a given operation, a necessary area size for the registration of the content information estimated with respect to the key information corresponding to the record information on the basis of the management information and further function as area allocating means to allocate a storage area for the storage of the index on the basis of the calculated value, with the result that, as the effects, the allocation of the area with an appropriate size is possible in accordance with the management information of the record information inputted while the excessive area allocation is prevented.

In addition, in accordance with this invention, an index managing method of managing a storage condition, on a storage area, of an index composed of key information forming items and content information forming the contents of the key information, comprises: a step of updating management information related to the index managed on the storage area on the basis of record information structured in unit of a set of key information and content information inputted as information to be added to the index managed on the storage area; a step of, when the index on the storage area is updated on the basis of the inputted record information, calculating a free area, to be set when necessary, on the basis of the management information; and a step of allocating said storage area for storage of the index on the basis of the calculated free area.

Thus, since this index managing method updates the management information on the basis of the record information inputted and calculates a free area to be set through the use of the management information to allocate an area at the updating of the index, as the effects, the area with an appropriate size is allocated in accordance with the management information of the record information inputted while the excessive area allocation is prevented.

Moreover, in accordance with this invention, a computer-readable recording medium retaining an index managing program for managing a storage condition, on a storage area, of an index composed of key information forming items and content information forming the contents of the key information, wherein the index managing program comprises: a step of updating management information related to the index managed on the storage area on the basis of record information structured in unit of a set of key information and content information inputted as information to be added to the index managed on the storage area; a step of, when the index on the storage area is updated on the basis of the inputted record information, calculating a free area, to be set when necessary, on the basis of the management information; and a step of allocating said storage area for storage of the index on the basis of the calculated free area.

Accordingly, with the computer-readable recording medium retaining an index managing program according to this invention, a computer updates the management information on the basis of the record information inputted and calculates the free area, to be set, by the use of the management information in updating the index to allocate the storage area for the storage of index, with the result that, as the effects, the area with an appropriate size is allocated in accordance with the management information of the record information inputted while the excessive area allocation is preventable.

DESCRIPTION OF THE PREFERRED EMBODIMENTS (a) Description of an Aspect of the Invention First of all, an aspect of the present invention will be described hereinbelow with reference to the drawings.

Figure 1:
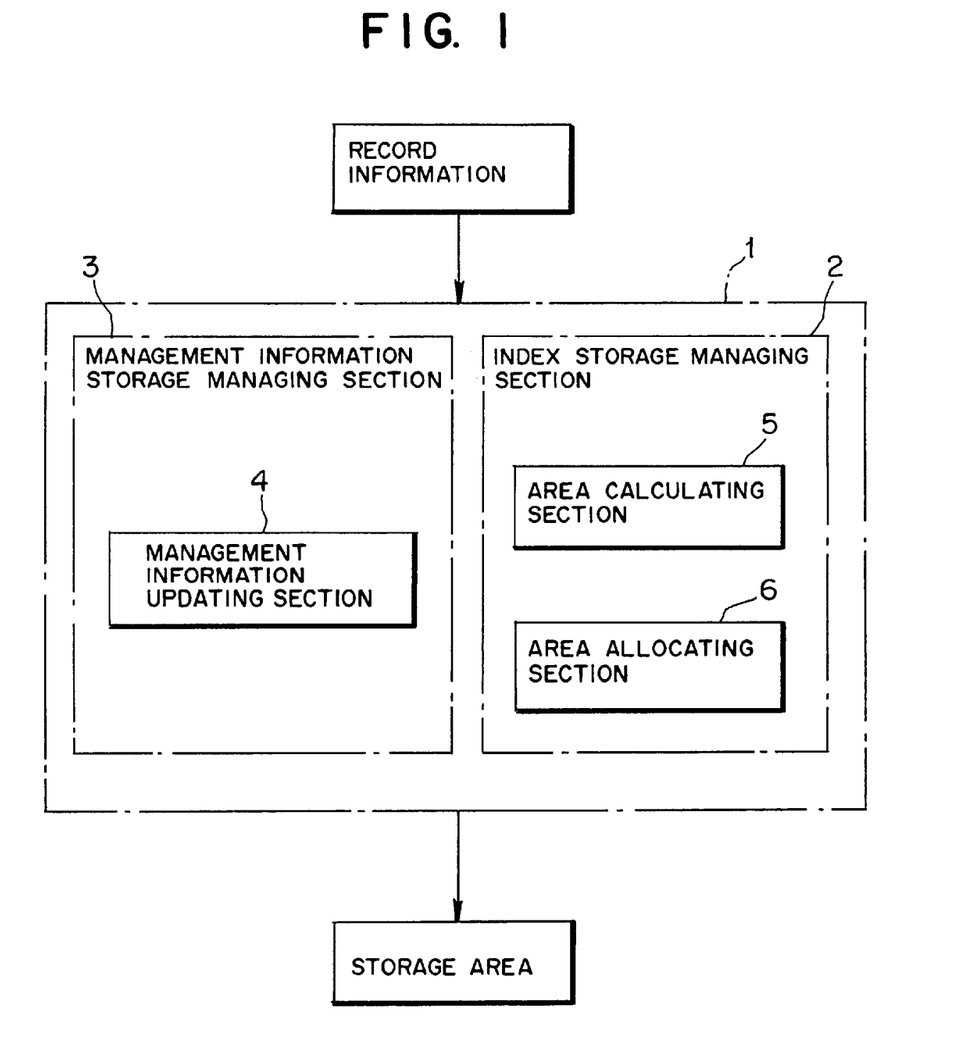
FIG. 1 is a block diagram showing an aspect of the present invention.

FIG. 1 is a block diagram showing the aspect of this invention. In FIG. 1, designated at numeral 1 is an index managing unit which is for the purpose of managing a storage condition, on a storage area, of an index composed of key information forming items and content information forming the contents of the key information.

Thus, the index managing unit 1 is made up of an index storage managing section 2 and a management information storage managing section 3.

In this arrangement, the index storage managing section 2 is made to manage, on the storage area, the content information corresponding to the key information constituting the index.

The management information storage managing section 3 is designed to control, on the storage area, management information associated with the index.

In addition, the management information storage managing section 3 is characterized by including a management information updating section 4.

This management information updating section 4 updates the management information under management on the storage area on the basis of record information structured in unit of a set of key information and content information inputted as information to be added to the index under management on the storage area.

Furthermore, the index storage managing section 2 is characterized by comprising an area calculating section 5 and an area allocating section 6.

The area calculating section 5 calculates a free area, to be set when necessary, through an arithmetic in accordance with the management information under management by a management information storage managing section when the index on the storage area is updated on the basis of the record information inputted.

The area allocating section 6 allocates a storage area for the storage of the index on the basis of the free area calculated in the area calculating section.

Accordingly, in the index managing unit 1 according to this invention, since the area calculating section 5 calculates a free area, to be set when necessary, through an arithmetic in accordance with the management information under management by the management information storage managing section 3 while the area allocating section 6 allocates a storage area for storage of the index on the basis of the calculated value, the allocation of an area with an appropriate size is achievable in accordance with the record information inputted while excessive area allocation is avoidable.

(b) Description of Embodiment

Referring to the drawings, a description will be made hereinbelow of an embodiment of this invention.

Figure 2:
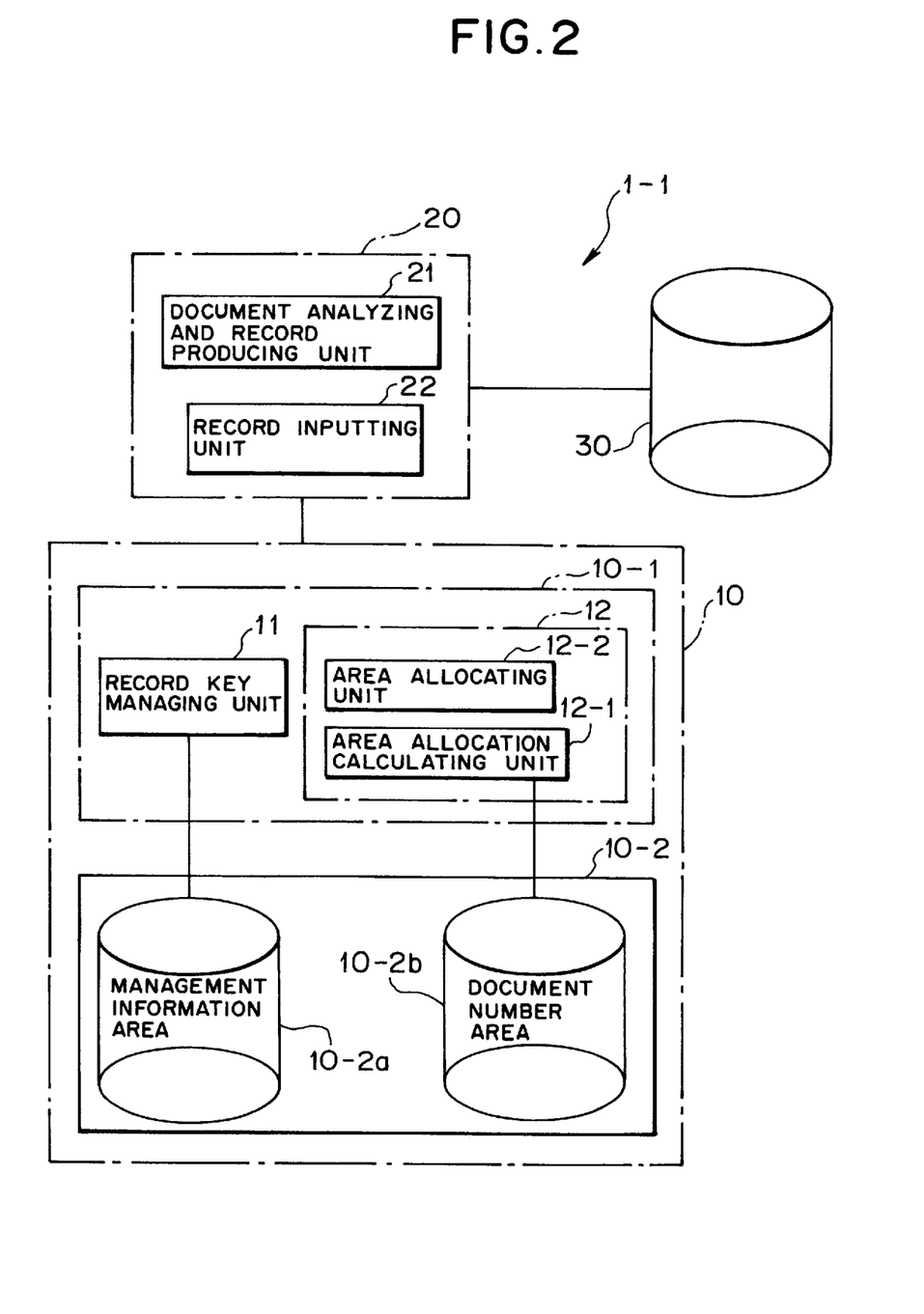
FIG. 2 is a block diagram showing the entire arrangement of a system to which an index managing unit according to an embodiment of this invention is applicable.

FIG. 2 is an illustration of the entire arrangement of a system based upon an index managing unit according to an embodiment of this invention, where a FIG. 2 system, generally designated at numeral 1-1, is made up of a record producing unit 20, an text database (which will be referred hereinafter to as a text DB) 30 and a managing unit 10.

The record producing unit 20 is for receiving a document from the text DB 30 storing sentences/documents to produce record information and to forward it to the managing unit 10.

In this case, in the record information, its data structure is made using a set of an item (key information) and a document number (content information). Further, this record information is used for management of an index in the managing unit 10.

The following table 1 indicates one example of record information in the embodiment of this invention.

TABLE 1

| Document No. | Document | Record Information [Item, Document No.] |
|---|---|---|
| 1 | koreha, hon desu | [kore, 1], [ha, 1], . . . |
| 2 | areha, hon desu | [are, 2], [ha, 2], . . . |
| 3 | bungshoga, arimasu | [bunsho, 3], [ga, 3], . . . |
| 4 | areha, bunsho desu | [are, 4], [ha, 4], . . . |
| . | . | . |
| . | . | . |
| . | . | . |
| 10000 | areha, neko desu | [are, 10000], [ha, 10000], . . . |

In this table 1, the documents and the items are expressed in Japanese for convenience only. This invention is, off course, applicable to documents and items written in English.

Referring to the one example of record information shown in the above table 1, the record producing unit 20 creates a plurality of record information ([kore, 1], [ha, 1] etc.) from the document "koreha, hondesu" numbered (1), and then forwards them to the managing unit 10.

Accordingly, the record producing unit 20 is composed of a document analyzing and record producing unit 21 and a record inputting unit 22.

The document analyzing and recording producing unit 21 here works to produce record information comprising items and document numbers. The document analyzing and record producing unit 21 extracts an item from a document read out from the text DB 30 to produce record information by a combination of the extracted item and a document number.

For instance, the document analyzing and record producing unit 21 can produce the record information in such a manner that a document which is written in a state of being not classified into Japanese, Chinese and others is divided into words or morphemes according to a morpheme analysis to extract items and the extracted items are combined with the number given to each document in advance when being stored in the text DB 30.

Concretely, after reading out the document "areha, hon desu" corresponding to the document number 2 shown in the above table from the text DB 30, the document analyzing and record producing unit 21 combines the extracted items (are, hon, etc.) with the document number (2) to make the record information ([are, 2], [ha, 2], [hon, 2], etc.).

The record inputting unit 22 outputs, to the managing unit 10, the record information produced in the document analyzing and record producing unit 21.

The managing unit 10 manages or controls an index on the basis of a plurality of records produced in the record producing unit 20.

The following table 2 shows an index as one example, where the items are written in Japanese.

TABLE 2

| Index | |
| --- | --- |
| Item | Document No. |
| kore | 1, ... |
| are | 2, ... |
| ha, | 1, 2, 4, ... |
| hon | 1, 2, ... |
| bunsho | 3, 4, ... |
| desu | 1, 2, 4, ... |
| . | . |
| . | . |
| . | . |

In this case, although [kore, 1, •••] and others written in the table 2 are constructed as an index which permits extracting a document number with an item in relation to each item, the following description will be made assuming that an index comprises a data group including a plurality of combinations of items and document numbers corresponding to the items exemplified in the table 2. However, a similar function takes place even if the index is structured with a combination of one item and the document number corresponding thereto.

Incidentally, in the document analyzing and recording producing unit 21, the read-out of a document from the text DB 30 depends upon the design by a designer or the like. Although the following description will be made on the assumption that the record information is produced in the order of document numbers, other record information production is also available.

For this reason, the managing unit 10 is equipped with an index managing unit 10-1 and a storage area 10-2.

The index managing unit 10-1 takes charge of managing the storage condition of an index comprising items and document numbers onto the storage area 10-2, and includes a record key managing unit 11 and a calculation and allocation unit 12.

The record key managing unit 11, serving as a management information storage managing section, manages management information about the index on the storage area 10-2.

In other words, the record key managing unit 11 is designed to manage statistics information on the index as the management information, and more specifically, it stores the number (knum) of inputted record information for each item, the number (N) of all inputted record information stored on the storage area 10-2, the number (L) of record information expected to be added as record information corresponding to each item (which is sometimes referred hereinafter to as the number of provisional registrations), size information (krsize) of a document number serving as content information corresponding to each item organizing the index, and others.

In addition, the record key managing unit 11 is made to additionally store each item, a pointer or the like as an address for an area for storing a document number to each item, and others.

The following table 3 shows one example of management information in the embodiment of this invention.

TABLE 3

| | |
| --- | --- |
| Total Number (N) of Documents | 100000 |
| Number (L) of Expected Provisional Registrations | 200000 |
| Total Number (K) of Keys | 10000 |

In this table 3, the total number (N) of documents signifies the number of documents of which corresponding record information are managed in the managing unit 10 at the updating of the index, and the number (L) of expected provisional registrations signifies the number of expected documents being a candidate for management by the managing unit 10, and the total number (K) of keys means the number of kinds of items under management by the managing unit 10.

Furthermore, the following table 4 shows one example of management information for each item in the embodiment of this invention, where the items are written in Japanese.

TABLE 4

| Item | Management Information | |
| --- | --- | --- |
| kore | number (knum) of document numbers for item | 5000 |
| | to-item storage area size (krsize) | 20000 |
| bunsho | number (knum) of document numbers for item | 2 |
| | to-item storage area size (krsize) | 8 |
| ha | number (knum) of document numbers for item | 9500 |
| | to-item storage area size (krsize) | 38000 |

In this table 4, the number (knum) of document numbers for one item, serving as management information, assumes 500, for example, in the case of the item "kore", which signifies that the item "kore" is included in 500 documents.

Furthermore, in the table 4, the to-item storage area size (krsize) signifies an area size necessary for storage of the document numbers corresponding to the item, and takes 38000 bytes, for example, for the item "ha". In this case, the area size necessary for the allocation to the storage of one item "ha" is 4 bytes and the number (knum) of document numbers with respect to a key is 9500, and therefore, the to-item storage area size (krsize) results in an equation: krsize=9500×4=38000 (byte).

Still further, the record key managing unit 11 updates the above-mentioned management information in succession whenever processing the record information from the record producing unit 20. In other words, the record key managing unit 11 functions as a management information updating section to update the management information under management on the storage area 10-2 on the basis of the record information constructed in units of a set of an item inputted as information to be added to the index under management on the storage area and a document number.

A further description will be made hereinbelow with reference to the foregoing tables 3 and 4.

The storage area 10-2, under control of the record key managing unit 11, stores management information such as information about a plurality of items constituting an index and the total number (N) of documents, and further stores document numbers corresponding to the respective items.

Because of these functions, the storage area 10-2 includes a management information area 10-2a and a document number area 10-2b.

The management information area 10-2a is for storing management information such as information about items constituting an index and the total number (N) of documents available for allocation of areas.

In more detail, the management information area 10-2a stores the number (knum) of inputted record information for each item, the total number (N) of documents, the area size (krsize) needed for storage of one or more document numbers corresponding to each item composing an index, and other information. In addition, information indicative of the range of an area producing the document number area 10-2b and others are also put in the document number area 10-2a.

The document number area 10-2b is for storing the document numbers corresponding to the respective items. As the mode of storing the document numbers in this document number area 10-2b, the document numbers corresponding to the respective items are placed in consecutive areas divided at every item. For instance, the document numbers "1, 2, •••" equivalent to the item "hon" shown in the table 2 are stored in the successive areas allocated with respect to the item "hon" in the document number area 10-2b.

On the other hand, the calculation and allocation unit 12 serving as the index storage managing section is made to manage, on the storage area 10-2, the document numbers corresponding to the items constituting the index.

More specifically, the calculation and allocation unit 12 mainly conducts the allocation of areas for ensuring consecutive areas for each item and the calculation of the area size to be allocated when the document numbers are stored in the document number area 10-2b.

For these operations, the calculation and allocation unit 12 is provided with an area allocation calculating unit 12-1 and an area allocating unit 12-2.

In addition, the calculation and allocation unit 12 can also store document numbers in an area allocated in relation to an item within the document number area 10-2b.

Besides, the following description assumes that the calculation and allocation unit 12 performs the storage of the document numbers onto the storage area 10-2.

The area allocation calculating unit 12-1 acting as an area calculating section calculates a free area size, to be set when necessary, through the use of management information under management by the record key managing unit 11 when an index on the storage area 10-2 is updated on the basis of the record information inputted.

In addition, the area allocation calculating unit 12-1 can calculate an area size to be allocated initially for a key that appears for the first time.

In this case, the area allocation calculating unit 12-1 is made to calculate an area size (r) to be allocated initially in accordance with the following equation (1).

$$r = n + A \times 1/\log_2(N) \tag{1}$$

That is, the equation (1) for the calculation of the area size to be allocated initially calculates the allocation area size on the basis of the byte count of an area size (n) necessary for the storage of one document number for an item, an area size sufficient as a standard for the registration of all documents (which will be referred hereinafter to as an initial allocation constant) A and the total number N of documents at the time of processing.

Although the following explanation will be given of an example that the initial allocation constant is at 1024 bytes, it is also possible that the initial allocation constant A is set to a different value depending upon the design by the designer or the like.

Incidentally, the equation (1) is under the condition that the calculation is made as $\log_2(1)=1$ when the total number of documents is at 1, in other words, at the time of processing the first document.

As a calculation example for the initial allocation area size (r), the area allocation calculating unit 12-1 is made to calculate the initial allocation area size (r) using the equation (1) with respect to a key that, for instance, the area size (n) needed for the storage of one document number associated with an item which occurs on the first document (N=1) attains to 4 bytes, so that the calculation gives 1028 bytes as seen by the following equation (2).

$$r = 4 + 1024 \times 1/\log_2(1) = 1028 \tag{2}$$

Furthermore, as a calculation example for another initial allocation area size, the area allocation calculation unit 12-1 calculates the initial allocation area size using the equation (1) with respect to a key that, for instance, the area size (n) required for the storage of a document number corresponding to an item which appears on the 10000th document covers 4 bytes, so that the calculation result indicates 82 bytes as given by the following equation (3).

$$r = 4 + 1024 \times 1/\log_2(10000) \approx 82 \tag{3}$$

The area allocation calculating unit 12-1 is designed to conduct an arithmetic to reduce the initial allocation area size (r) with the increase in the number of documents.

Moreover, through the calculation, the area allocation calculating unit 12-1 yields a small document number registration area size for an item with a low occurrence frequency, while supplies a large document number registration area size for an item with a high occurrence frequency.

That is, this area allocation calculating unit 12-1 calculates the area size (r) taking into consideration the fact that a word which appears frequently substantially occurs in a given number of documents.

Meanwhile, the area allocation calculating unit 12-1 calculates a free area needed for the addition of document number information when the area for the addition of a document number is in short supply on the storage area 10-2.

That is, when difficulty is encountered to newly store one document number in the area allocated in the document number area 10-2b, the area allocation calculating unit 12-1 is designed to recalculate an area size necessary for the allocation.

In detail, the area allocation calculating unit 12-1 calculates an additional allocation area size (r') in accordance with the following equation (4).

$$r' = n + krsize + (knum/N \times krsize) \times L/N \tag{4}$$

This equation (4) for the calculation of the additional allocation area size to be incremented is for calculating the area size (r') required for the actual allocation on the basis of an area size (n) necessary for the storage of one document number for an item, a to-item storage area size (krsize), the number (knum) of record information for an item, the total number (N) of documents and the number (L) of expected provisional registrations.

In the equation (4), (knum/N×krsize)×L/N signifies an additional area size estimated to be taken before reaching the number (L) of expected provisional registrations.

As one example of the calculation for the additional allocation area size (r'), the area allocation calculating unit 12-1 calculates the additional allocation size (r') through the use of the equation (4) with respect to a key in which, for instance, the frequency of occurrences is taken to be 10 when the number of processed documents attains to 10000 at the present time, the to-item storage area size (krsize) assumes 40 bytes, and the necessary area size (n) for newly storing one document number comes to 4 bytes when the maximum number (L) of documents expected to be registered is taken to be 20000, so that the calculation results in 44 bytes as seen by the following equation (5).

$$r'=4+40+(10/10000\times40)\times20000/10000\approx44 \quad (5)$$

As another example of the calculation for the additional allocation area size (r'), the area allocation calculating unit 12-1 calculates the additional allocation size (r') through the use of the equation (4) with respect to a key in which, for instance, the frequency of occurrences is taken to be 3800 when the number of processed documents attains to 10000 at the time of updating the index, the to-item storage area size (krsize) assumes 15200 bytes, and the necessary area size (n) for newly storing one document number assumes 4 bytes, so that the calculation results in 26756 bytes as seen by the following equation (6).

$$r'=4+15200+(3800/10000\times15200)\times20000/10000=26756 \quad (6)$$

As seen from the above-mentioned additional allocation area size (r') calculation results, the area allocation calculating unit 12-1, in calculating the re-allocation area size, yields a small area size (r') for an item with a low occurrence frequency while presenting a large area size (r') for an item with a high occurrence frequency.

Furthermore, the area allocation calculating unit 12-1, in calculating an area size (r') necessary for the re-allocation, estimates a coming occurrence probability on the basis of statistics information such as the occurrence frequency (N) of an item, the to-item storage area size (krsize) and the maximum number (L) of documents expected to be registered, and calculates an estimated value based on this estimated occurrence probability as an area size estimated to be necessary at the increment.

The area allocating unit 12-2 serving as an area allocating section is for the purpose of allocating, on the basis of the free area sizes (r) and (r') calculated in the area allocation calculating unit 12-1, an area for storage of a document number corresponding to each item within the document number area 10-2b of the storage area 10-2 for storage of an index.

Figure 3A:
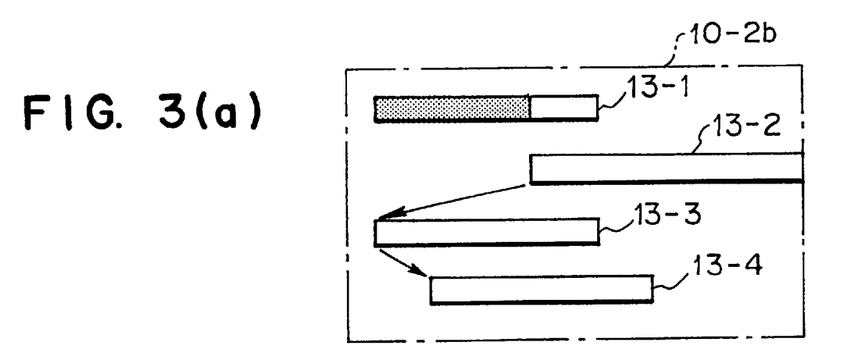
FIGS. 3(a) to 3(c) are illustrations of storage images in a document number area in the embodiment of this invention.
Figure 3B:
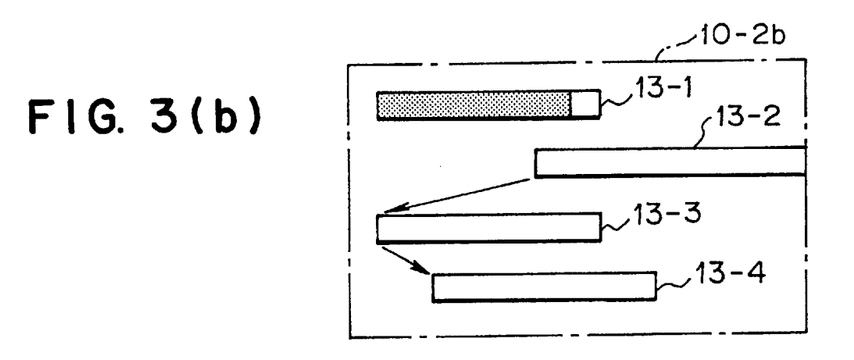
Figure 3C:
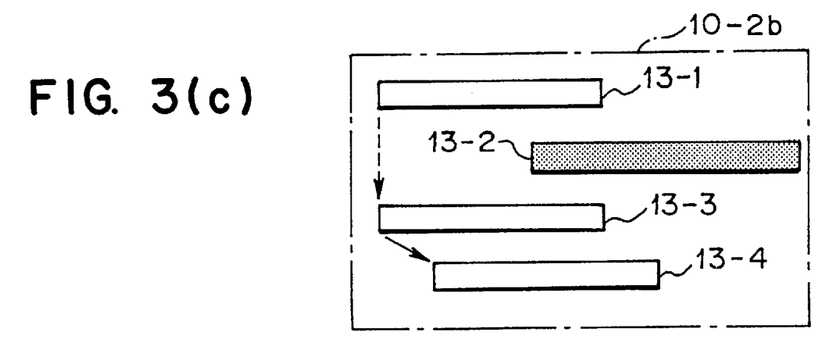

FIGS. 3(a) to 3(c) are illustrations of storage images in the document number area 10-2b in the embodiment of this invention.

The area allocating unit 12-2 allocates one of areas 13-1 to 13-4 in a void space list on the document number area 10-2b to the item for which the area allocation calculating unit 12-1 calculates the initial allocation area size (r) or the area size (r') necessary for the re-allocation.

Incidentally, the addresses for the void space list areas 13-1 to 13-4 and the information including the area sizes are managed as management information in the record key managing unit 11.

In this case, the area to be used in one of the void space list areas 13-1 to 13-4, put to use for the storage of information, takes the area sizes (r), (r') the area allocation calculating unit 12-1 calculates. The storage of a document number is made within the calculated area sizes (r), (r').

FIG. 3(a) shows a storage image at the calculation of the initial allocation area size, and in the document number area 10-2b shown in FIG. 3(a), one area 13-1 of the void space list areas 13-1 to 13-4 is allocated as the initially allocated area in the area allocating unit 12-2 before being put to use.

The area allocating unit 12-2 conducts the selection of one of the void space list areas 13-1 to 13-4 on the basis of the management information.

For instance, the area allocating unit 12-2 selects one of the void space list areas 13-1 to 13-4, larger than the area sizes (r), (r') calculated in the area allocation calculating unit 12-1, on the basis of the management information.

In this instance, the area allocating unit 12-2 can use address information such as pointers as the management information.

In FIGS. 3(a) to 3(c), portions shadowed on the document number area 10-2b are in use. That is, in FIGS. 3(a) to 3(c), the shadowed areas being in use are allocated to be peculiar to one key.

Moreover, the area allocating unit 12-2 is designed to allocate areas to store the document numbers corresponding to the respective keys in the successive areas. That is, the in-use areas shadowed in FIGS. 3(a) to 3(c) are for successively storing the document numbers corresponding to one key. For instance, the document number 1, the document number 2, the document number 100000 and other numbers are stored in succession.

Although FIGS. 3(b) and 3(c) illustrate images of the storage areas to be taken for the increment of the area to be put to use, the following description will be made on the assumption that they are the images taken when the area to be put to use is incremented from the state of the document number area 10-2b shown in FIG. 3(a).

The in-use areas shown in FIGS. 3(b) and 3(c) indicate the states that the initially allocated area (the in-use area shown in FIG. 3(a)) is expanded in succession when the initially allocated area is insufficient for newly adding and storing a document number.

The area allocating unit 12-2, in allocating the expanded area, shifts the incremented area into one of the other void space list areas 13-2 to 13-4 when difficulty is encountered to expand it within the void space list area 13-1 already allocated.

FIG. 3(c) is an illustration of a storage image appearing in the case that the incremented area is shifted to a different void space list area for the allocation, and as seen from the FIG. 3(c) storage image, the area allocating unit 12-2 not only promote the increment of the area, but also shifts and rewrite it to a different area to achieve the area allocation.

The area allocated on the aforesaid storage area at every item is stored as management information in a manner of relating the item to a pointer in the record key managing unit 11. Meanwhile, although the above-mentioned system 1-1 can be constructed by using a general-purpose or special-purpose computer or the like as the record producing unit 20 and the managing unit 10, describing the aforesaid record key managing unit 11, document analyzing and record producing unit 21 and other units in connection with concrete hardware, the above-mentioned record key managing unit 11, area allocating unit 12-2, area allocation calculating unit 12-1, document analyzing and recording producing unit 21 and others are equivalent to a central processing unit (CPU), while the storage area 10-2 and the text DB 30 correspond to a medium such as a memory, a hard disk, a magnetic tape, a magnetic disk and a magneto-optical disk and others for retaining, storing and recording information or different storage units.

The following description will be made on the assumption that the managing unit 10 and others are constructed with a special-purpose computer (which can be referred hereinafter to as a computer) and a CPU functions as the record key managing unit 11, the document analyzing and record producing unit 21 and others and further a magnetic disk works as the storage area 10-2 and the text DB 30. However, it is also acceptable that the managing unit 10 and others are constructed with a general-purpose computer and the storage area 10-2 is made with a medium other than the magnetic disk, which offers similar effects.

Referring to a flow chart of FIG. 4, an operation of a computer with the above-mentioned arrangement according to the embodiment of this invention will be described hereinbelow in detail in a way of connecting the record key managing unit 11 and others with the CPU and others.

Figure 4:
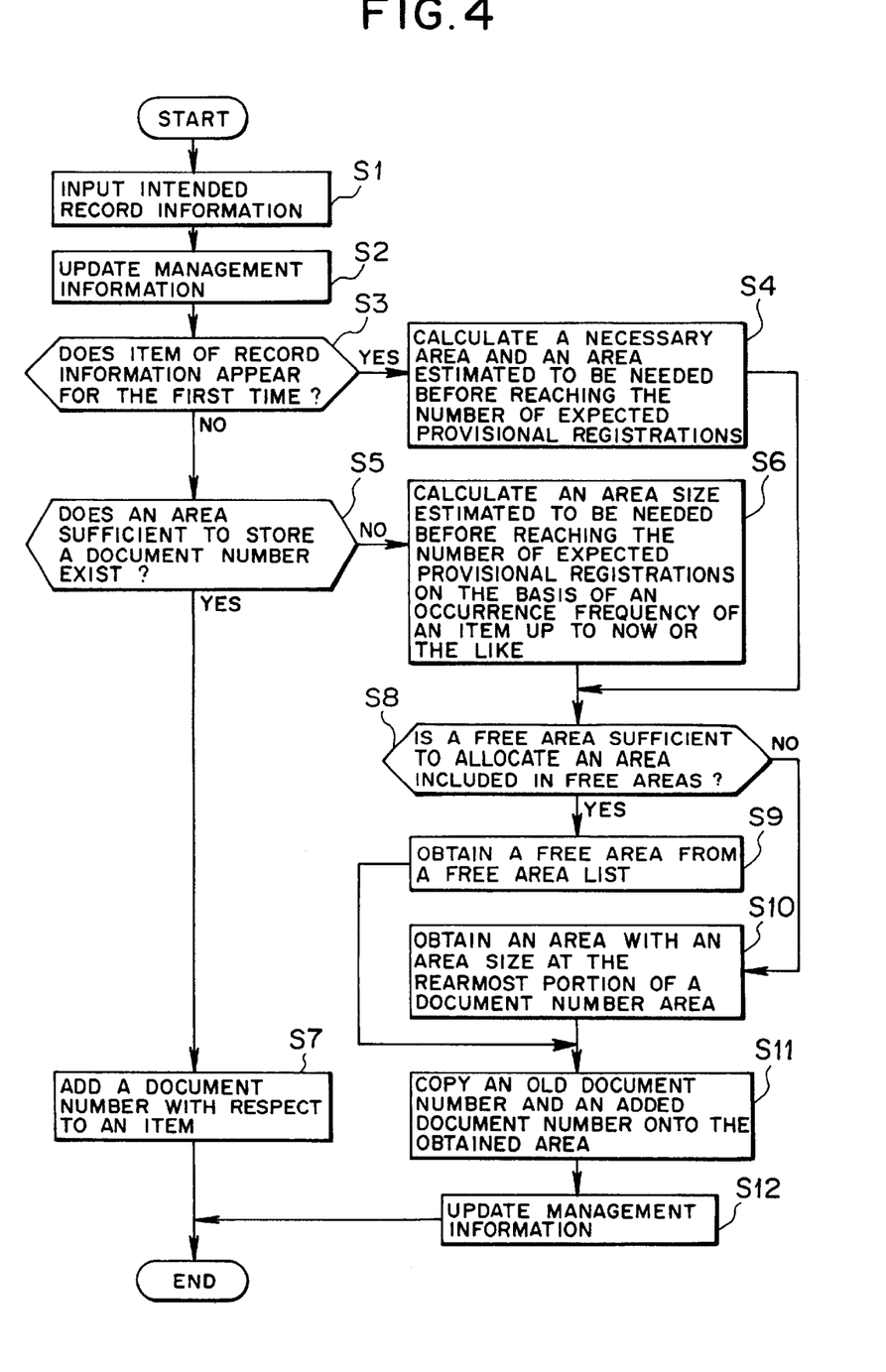
FIG. 4 is a flow chart showing the flow of processing to be taken at the updating of an index in a computer according to the embodiment of this invention.

FIG. 4 is a flow chart showing the flow of processing to be taken for when a computer according to the embodiment of this invention updates an index, and with this FIG. 4 processing, a CPU makes the input of the necessary record information from the record producing unit 20 (step S1), and further updates the management information about items and others (management information updating step S2).

At this time, the CPU updates the management information involving the total number (N) of document numbers and the number (knum) of document numbers corresponding to a key.

In other words, the CPU operates as the record key managing unit 11 to update the management information shown in the above-mentioned table 3 and others and further to make the management information after the updating stored in the management information area 10-2a.

On the other hand, the CPU decides whether or not an item of the record information appears for the first time (extraction step S3). At this time, the CPU extracts a position on the storage area for the registration of a document number of the inputted record information from the management information on the basis of an item corresponding to the record information. In other words, the CPU decides whether or not an area for the storage of document number information of the inputted record information is under management.

If the item appears for the first time, since an area allocated for the item does not exist, the CPU calculates a necessary area and an area estimated to be needed before the number (L) of expected provisional registrations (area calculation step S4).

That is, the CPU, functioning as the area allocation calculating unit 12-1, calculates the initial allocation area size (r).

In this case, the CPU calculates, through the use of the management information, an area size $A \times 1/\log_2(N)$ estimated to be required before the number (L) of expected provisional registrations.

In addition, the CPU adds the area size $A \times 1/\log_2(N)$ estimated to be required before the number (L) of expected provisional registrations to the area size (n) necessary for the allocation of one new document number, thereby calculating the initial allocation area size (r).

For instance, the CPU calculates the initial allocation area size (r) using the equation (1) with respect to a key that the area size (n) necessary for the storage of one document number corresponding to an item appearing at the time of the first document assumes 4 bytes, so that the calculation gives 1028 bytes. On the other hand, the CPU calculates the initial allocation area size (r) through the equation (1) with respect to a key that the area size (n) necessary for the storage of one document number corresponding to an item appearing at the time of the 10000 th document is at 4 bytes, thus obtaining 82 bytes.

As seen from the initial allocation calculation results in the aforesaid two examples, the CPU calculates an initial allocation area size to a key in accordance with the number (N) of documents at the time of processing record information.

More specifically, the CPU, in calculating an initial allocation area size with respect to a key appearing for the first time while the total number (N) of documents included in the index increases, conducts an operation through the use of the management information to lessen the area size (r) to be allocated as the total number (N) of documents at that time becomes larger.

On the other hand, when an item of the inputted record information already occurs, the CPU checks, on the basis of the management information, whether or not there is an area sufficient to newly store a document number (decision step S5).

In the case that the item already occurs and the management information for the item exists, the CPU checks whether the area already allocated is sufficient or not.

In other words, the CPU makes a decision on the basis of the management information. For instance, the CPU makes a decision through the comparison of the number (knum) of document numbers stored in the management information area 10-2a or the area size actually allocated. For instance, if the area size (n) necessary for the storage of one new document number with respect to the key "kore" assumes 4 bytes and the area size (r) actually allocated covers 1024 and further the number (knum) of document numbers to the key comes up to 200, this means that an area allowing the storage of 1024−4×200=224 bytes exists within the actually allocated area.

In the case that the area already allocated is insufficient, the CPU again calculates an area size, estimated to be needed before the number (L) of expected provisional registrations, on the basis of the occurrence frequencies of the items up to now and others (area calculation step S6).

The CPU calculates an area size (r) necessary for the re-allocation through the aforesaid equation (4) on the basis of the management information such as the byte count of a size (n) necessary for the allocation of only one new document number, a to-item storage area size (krsize), the number (knum) of inputted record information for each item, the total number (N) of documents and the number (L) of expected provisional registrations.

In this case, through the calculation, the CPU provides a small area with respect to a key such as an item with a low occurrence frequency as shown by the calculation for the additional allocation area size (r) exemplified by the aforesaid equation (5), while offering a large area in relation to an item with a high occurrence frequency as exemplified by the foregoing equation (6).

Furthermore, the CPU makes a condition decision for acquisition of a free area, i.e., checks whether or not a free area sufficient for the area allocation exists within a free area (step S8).

Concretely describing the processing by the CPU and others with reference to the above-mentioned images of the storage area shown in FIGS. 3(a) to 3(c), the CPU decides whether or not an area exceeding the value of the calculated area size (step S4 or S6) lies within the void space list areas 13-1 to 13-4 of the document number area 10-2b.

If the area exceeding the calculated size value (step S4 or S6) is within the void space list areas 13-1 to 13-4 of the document number area 10-2b, the CPU acts as the area allocating unit 12-2 to allocate an area to be used (area allocation step S9).

More specifically, as shown in FIGS. 3(a) to 3(c), the CPU allocates one of the void space list areas 13-1 to 13-4 in the document number area 10-2b, the record managing unit 11 manages, as an area for storing a document number to a key that appears newly.

Furthermore, as shown in FIG. 3(b), when it is possible to expand an area within the void space list area 13-1 used at the area re-allocation, the CPU performs the area re-allocation in a state where an area in additional area size is directly added to the rear side of the used area before the expansion.

Besides, as illustrated in FIG. 3(c), in conducting the area re-allocation, the CPU successively allocates an area within a different void space list area satisfying the condition when the void space list area 13-1 allocated previously is smaller than an area for the re-allocation.

Meanwhile, if a sufficient area does not exist within a free area at the area allocation, the CPU acquires an area corresponding to an area size at the rearmost portion of the document number area 10-2b (area allocation step S10).

More specifically, the CPU reallocates an area out of the document number area 10-2b when an area for the area re-allocation does not exist within the void space list 13-1 to 13-4.

For instance, in the images shown in FIGS. 3(a) to 3(c), if assuming that the base of the rectangular document number area 10-2b signifies the rearmost portion of the document number area, an area necessary for the re-allocation is allocated to below the base thereof.

That is, in this case, the CPU expands the document number area 10-2b.

After the allocation of a desired area, the CPU stores the old document number and the added document number in the acquired area (registration step S11).

To put it concretely, the CPU records the document number within the allocated area with respect to a key that appears for the first time.

Meanwhile, if an area is allocated in the expansion mode, the CPU records a new document number in a state of consecutively following the document number information already recorded within the allocated area.

On the other hand, if an area is allocated in the shift mode, the CPU copies and records the document number stored previously within the re-allocated area, and further consecutively records a document number to be newly added (registration step S11).

Furthermore, the CPU, serving as the record key managing unit 11, updates management information such as pointers indicating addresses within the document number area 10-2b for recording document numbers to items, and records that information in the management information area 10-2a (management information updating step S12).

Still further, even in the case that a decision is made to that there is an area for additionally storing a new document number (step S5), the CPU records it in a state of consecutively following the document number information already recorded (registration step S7).

As described above, with the computer according to the embodiment of this invention, the area allocation calculating unit 12-1 calculates, through an arithmetic, an area size to be allocated through the use of statistics information forming management information about an index stored under management by the record key managing unit 11, while the area allocating unit 12-2 allocates an area for the storage of a document number, with the result that excessive area allocation is prevented and an area with an appropriate size is allocable.

In addition, with the computer according to the embodiment of this invention, the statistics information such as the total number (N) of documents, the number (L) of expected provisional registrations, the number (knum) of inputted record information for each item and the to-item storage area size (krsize) are recorded as the management information for the calculation of the area size, so that excessive area allocation is prevented and an area with an appropriate size is allocable.

Furthermore, with the computer according to the embodiment of this invention, even in a manner that the area allocating unit 12-2 allocates the storage area so that the document numbers corresponding to the respective items are stored in successive areas, excessive area allocation is prevented and an area with an appropriate size is allocable.

Still further, with the computer according to the embodiment of this invention, even in a manner that the area allocating unit 12-2 peculiarly allocates successive areas for the storage of document number information at every item, excessive area allocation is prevented and an area with an appropriate size is allocable.

Meanwhile, with the computer according to the embodiment of this invention, in the case that an area for the addition of document number information is insufficient within the storage area, when obtaining a free area necessary for the addition of the document number information, the area allocation calculating unit 12-1 calculates an area size on the basis of the statistics information such as the total number (N) of documents and the number (knum) of inputted record information for each item, so that excessive area allocation is preventable and an area with an appropriate size is allocable.

On the other hand, with the computer according to the embodiment of this invention, through the calculation, the area allocation calculating unit 12-1 provides a small area size for the document number registration for an item with a low occurrence frequency while offering a large area size for the document number registration for key information with a high occurrence frequency, so that excessive area allocation is prevented and an area with an appropriate size is allocable.

Moreover, with the computer according to the embodiment of this invention, the area allocation calculating unit 12-1 executes calculation to lessen the initial allocation area to be allocated for a key appears initially in accordance with the increase in the total number (N) of documents contained in an index, with the result that excessive area allocation is preventable and an area with an appropriate size is allocable.

Incidentally, the computer according to the embodiment of this invention can also make the aforesaid CPU function as the record key managing unit 11 and others by executing an index updating program.

A description will be made hereinbelow of management of an index occurring in conjunction with the execution of the index updating program by the computer.

In this case, the computer receives the index updating program in a manner of reading it from an information recording medium such as a magnetic disk including a magneto-optical disk and a floppy disk and a magnetic tape, storing it in its hard disk through a communication line, or reading it from a communication line or a medium on occasion.

When executing the index updating program, the computer develops the index updating program in a memory (not shown) so that a CPU (not shown) can perform desired operations.

The following description will be made on the assumption that the index updating program is installed from a recording medium into the computer. However, it is also possible to employ a mode of installing it through a communication line or from a recording medium on occasion, which leads to the same effects.

The computer reads the index updating program written in a recording medium, and the CPU executes an operation control for managing an index as will be mentioned hereinafter.

In this case, the index updating program is constructed as a string of sequenced instructions suitable for the computer processing which put a computer into operation as a management information updating means, an extraction means, a decision means, an area calculating means and a registration means when information to be added to an index comprising items and document numbers is registered in the storage area 10-2 to update the index.

The management information updating means is made to receive record information comprising a set of an item and a document number as information to be added to the index, and to make the computer function to update index management information on the basis of the inputted record information (management information updating step).

By executing the index updating program developed on the memory, the CPU updates the information about the total number (N) of documents forming the management information put in a hard disk.

The extraction means functions as a mean to extract a position on the storage area 10-2 where a document number of the inputted record information is registered (extraction step).

At this time, by executing the index updating program developed on the memory, the CPU controls the hard disk to retrieve the information about the item of the inputted record in the management information stored in the hard disk.

The decision means makes the computer run to decide whether or not successive free areas with a size necessary for the registration of the document number of the inputted record information exist at the position on the storage area which is attained as a result of the extraction by the extraction means (decision step).

At this time, by executing the index updating program developed on the memory, the CPU controls the hard disk and others to read out the desired management information from the hard disk and to put it in the memory. More specifically, the CPU performs calculation on the basis of the management information such as an area size necessary for newly adding one document number, thereby deciding whether or not a new document number can be added to the area already allocated on the memory.

The area calculating means is for making the computer run to calculate, through a given operation expression, the size of an area for the document number information registration estimated to be needed for an item of record information when difficulty is encountered to extract a position on the storage area 10-2 or the decision means makes a decision that no successive free areas with a size necessary for the registration of the item of the record information exist (area calculation step).

In this case, by executing the index updating program developed on the memory, the CPU controls the hard disk to read out the statistics information and to put it in the memory in order to make a calculation of the area size (r) to be allocated through the use of the aforesaid equation (1) or (4). Further, the CPU performs arithmetic processing to obtain a desired area size on the basis of the statistics information.

The area allocating means is for making the computer run to allocate an area with the size calculated by the area calculating means for the registration of the document number of the record information (area allocation step).

At this time, by fulfilling the index updating program developed on the memory, the CPU controls the hard disk to read out the management information such as the area sizes of the void space list areas 13-1 to 13-4, and calculates on the basis of the management information read out and the value calculated by the area calculating means to decide whether or not there is a suitable void space list area for the allocation.

The registration means is for making the computer run to, if the decision means makes a decision that successive free areas exist, register the document number of the inputted record information to be added into the free areas or, if the area allocating means allocates an area, register it into the allocated area (registration step).

At this time, by fulfilling the index updating program developed on the memory, the CPU controls the hard disk so that the document number of the inputted record information is stored in a given area.

On the other hand, in the case of shifting the area, the CPU controls the hard disk to copy the document number already stored for putting it in a newly allocated area, and further to store a document number of record information newly inputted.

Besides, the CPU makes the document number of the inputted record information stored in an area allocated for a key that appears for the first time.

With the above-mentioned functions, the computer estimates an area necessary for the storage of the document number on the basis of the statistics information to allocate an appropriate area.

Thus, by executing the index updating program stored in the storage medium, the computer can prevent the allocation of the excessive area and allocate an area with an appropriate size.

(c) Others

In the above description (b), the record key managing unit 11 is designed to receive the intended record information (step S1) and to update the management information (step S2).

In this case, it is also appropriate that the CPU conducts the storing processing of the information on the total number (N) of documents constituting the management information into the hard disk simultaneously with updating another information such as a pointer (step S12), but not conducting it concurrently with updating the management information.

Furthermore, the record information can have a data structure comprising one item and a plurality of document numbers. Even in this case, it is possible to update the index management information.

Still further, although described above in detail, this invention covers all changes and modifications which do not constitute departures from the spirit and scope of the invention.

What is claimed is:

1. An index managing unit managing condition of a storage area of a storage device for a computer, the storage area storing an index containing key information and content information associated with the key information and each key information and the associated content information occupying part of the storage area allocated for storage of the key information, said index managing unit comprising:
- (I) an index storage managing section managing the content information in the storage area corresponding to the key information; and
- (II) a management information storage managing section managing management information related to management of the index and the management information storage managing section having a management information updating section updating the management information based on receiving a set of key information and content information from a database said index storage managing section including,
- (i) an area calculating section calculating an estimated optimum capacity of a free area for storage of the received content information based on the management information, which is managed by the management information storage managing section, according to a total number of the key information and the content information received and stored in the storage area as the index, and
- (ii) an area allocating section allocating the optimum free area, whose capacity has been calculated by the area calculating section, for the received content information.

2. An index managing unit as defined in claim 1, wherein said management information storage managing section manages, as said management information, as least one of a number of record information received for each of said key information, a total number of record information received and stored on said storage area, a number of record information expected to be added as record information corresponding to each of said key information, and size information of content information corresponding to each key information constituting said index.

3. An index managing unit as defined in claim 1, wherein said area allocating section is made to allocate said storage area to allow content information corresponding to each of said key information to be stored in successive areas.

4. An index managing unit as defined in claim 3, wherein said area allocating section is made to peculiarly allocate said successive areas for the storage of said content information at every said key information.

5. An index managing unit as defined in claim 4, wherein said area calculating section calculates a free area necessary for the addition of said content information when an area to be taken to add content information to said storage area is insufficient.

6. A method of updating an index that is in a storage area of a storage device for a computer, the storage area containing key information and content information associated with the key information, each of the key information and the associated content information occupying part of the storage area allocated for storage of the key information, comprising:
- (a) receiving at the computer record information including a set of key information and content information from a database;
- (b) searching in the storage area a free area allocated for the stored key information associated with the received content information and having capacity to store the received content information;
- (c) responsive to a successful result of the searching storing the received content information of the record information into the searched free area;
- (d) responsive to an unsuccessful result of the searching calculating an estimated optimum capacity of an alternative free area to store the received content information according to a total number of the record information received and stored in the storage area as the index, the record information including the set of key information and content information;
- (e) allocating in the storage area the alternative free area, whose capacity for storage of said received content information is estimated by the calculating; and
- (f) storing the received content information into the allocated alternative free area.

7. A method of updating an index as defined in claim 6, wherein said calculating estimates the optimum capacity of the alternative free area by reducing the optimum capacity as the total number of the record information increases.

8. A computer-readable recording medium storing an index updating program instructing a computer to execute a function of registering record information including a set of key information and content information associated with the key information, which is received from a database, and to be added to an index in a storage area of a storage device for the computer, the storage area containing the received key information and content information associated with the key information as the index and each of the key information and the associated key information occupying part of the storage area allocated for storage of the key information, said index updating program instructing the computer to execute a process, comprising:
- (a) searching in the storage area a free area allocated for the stored key information associated with the received content information, the free area having capacity to store the received content information;
- (b) responsive to a successful result of the searching storing the received content information of the record information into the searched free area;
- (c) responsive to an unsuccessful result of the searching calculating an estimated optimum capacity of an alternative free area to store the received content information according to a total number of the record information received and stored in the storage area as the index, the record information including the set of key information and content information;
- (d) allocating the alternative free area, whose optimum capacity for storage of the received content information is estimated by the calculating; and
- (e) storing the received content information of the record information into the allocated alternative free area.

9. An index managing method for managing a storage condition of a storage area of a storage device for a computer, which area stores an index containing key information and content information associated with the key information, said index managing method comprising:
- (a) receiving at the computer record information including a set of key information and content information from a database;
- (b) updating management information for managing a total number of the record information received from the database and stored in the storage area of the storage device;
- (c) upon the updating calculating an estimated optimum capacity of an alternative free area to store the received content information according to the total number of the key information and content information received; and (d) allocating the alternative free area, whose optimum capacity for storage of the received content information of the record information is estimated in the calculating.

10. A computer-readable recording medium storing an index managing program for instructing a computer to execute a function of managing a storage condition of a storage area of a storage device for the computer, which area stores an index containing key information and content-information associated with the key information, said index managing program instructing the computer to perform a process, comprising:

(a) receiving record information including a set of key information and content information from a database;

(b) updating management information for managing a total number of the record information which is received from the database and stored in the storage area of the storage device;

(c) upon the updating calculating an estimated optimum capacity of an alternative free area to store the received content information according to the total number of the key information and the content information received; and (d) allocating the alternative free area, whose optimum capacity for storage of the received content information of the record information is estimated in the calculating.

* * * * *